United States Patent
Guo et al.

(10) Patent No.: US 8,620,990 B2
(45) Date of Patent: Dec. 31, 2013

(54) PARSING CONTENTS OF AN E-FORM

(75) Inventors: Ying Chun Guo, Beijing (CN); Min Li, Beijing (CN); Qiang Wang, Beijing (CN); Xiao Feng Wang, Beijing (CN); Li Wei, Beijing (CN); Xiao Feng Zhao, Beijing (CN); Zhi Yuan Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1220 days.

(21) Appl. No.: 12/493,798

(22) Filed: Jun. 29, 2009

(65) Prior Publication Data

US 2009/0327513 A1    Dec. 31, 2009

(30) Foreign Application Priority Data

Jun. 30, 2008   (CN) .......................... 2008 1 0127269

(51) Int. Cl.
*G06F 15/16* (2006.01)
*G06F 17/00* (2006.01)

(52) U.S. Cl.
USPC .......................................... 709/201; 715/221

(58) Field of Classification Search
USPC ......................... 709/201, 203; 707/600, 602; 715/221–226
See application file for complete search history.

(56) References Cited

U.S. PATENT DOCUMENTS

| | | | | |
|---|---|---|---|---|
| 2002/0023108 | A1* | 2/2002 | Daswani et al. | 707/507 |
| 2002/0055909 | A1* | 5/2002 | Fung et al. | 705/42 |
| 2002/0062342 | A1* | 5/2002 | Sidles | 709/203 |
| 2004/0083426 | A1* | 4/2004 | Sahu | 715/505 |
| 2004/0123277 | A1* | 6/2004 | Schrader et al. | 717/143 |
| 2004/0205618 | A1* | 10/2004 | Sini et al. | 715/523 |
| 2004/0230536 | A1* | 11/2004 | Fung et al. | 705/64 |
| 2004/0237030 | A1* | 11/2004 | Malkin | 715/505 |
| 2005/0131815 | A1* | 6/2005 | Fung et al. | 705/39 |
| 2006/0041579 | A1* | 2/2006 | Miyashita et al. | 707/102 |
| 2007/0094372 | A1* | 4/2007 | Hariharan et al. | 709/223 |
| 2007/0168672 | A1* | 7/2007 | Izu et al. | 713/176 |
| 2007/0288657 | A1* | 12/2007 | Koskimies | 709/246 |
| 2007/0300145 | A1* | 12/2007 | Perelman et al. | 715/505 |

OTHER PUBLICATIONS

Homayounfar, H. et al; "A Parsing Cache for Highly Efficient XML Data Processing"; Proceedings of the IASTED International Conference on Web Technologies, Applications and Services (WTAS2006); 2006; pp. 177-182; Calgary, Canada.

* cited by examiner

*Primary Examiner* — Patrice Winder
*Assistant Examiner* — Julian Chang
(74) *Attorney, Agent, or Firm* — Steven L. Nichols; Van Cott, Bagley, Cornwall & McCarthy P.C.

(57) ABSTRACT

A method parses the contents of an e-Form, where the contents of said e-Form have been divided into more than one section with a different content identification code assigned to each section of the e-Form. The method includes scanning an e-Form submitted for processing to determine, based on the content identification codes, which of the sections have a corresponding parsed result already in a cache system; parsing contents of the sections without a parsed result already in the cache system; and combining parsed results from the cache system with parsed results from the parsing of sections without a parsed result already in the cache system.

22 Claims, 4 Drawing Sheets

PARSING CONTENTS OF AN E-FORM

BACKGROUND

An e-Form is an electronic form that typically mimics a paper form. It is often much more convenient to fill out an e-form than a paper form. As a result, the e-form is used more and more widely in different industries, such as banking, insurance, etc. Generally, when an end user fills out an e-Form on a client machine and submits the e-form to an e-Form server, the contents of the submitted e-Form need to be parsed by the e-Form server in order to construct an input for any back-end business services or applications. It can become a heavy workload for the e-Form server to parse a multitude of e-Forms or an e-Form with a large amount of e-Form content.

Usually, the e-Form server directly parses the entire content of a submitted e-Form at runtime. This parsing method is efficient for relatively small e-Forms. However, the e-Forms used in some industries are relatively large and fairly complex. In some cases, there are many e-Forms submitted in parallel, causing a heavy load to be placed on the e-Form server. The above-mentioned parsing method may cause the e-Form server to consume undue time and processing resources to parse the contents of an e-Form. This, in turn, may overwhelm the server causing a drop in performance. In some cases, the strain on the server may cause it to fail.

By way of example, the Association for Cooperative Operations Research and Development (ACORD) PCS XFDL e-Form is a standard e-Form for the insurance industry. The ACORD XFDL e-Form is submitted to a WebForm server. When the end user requests an ACORD XFDL e-Form, the WebForm server translates the e-Form into a DHTML file so that the end user can fill it out using a standard web browser. An example of a standard web browser would be Mozilla's Firefox or Microsoft's Internet Explorer. More specifically, the end user requests an e-Form through a web browser. The WebForm server then responds to the request by retrieving the requested XFDL e-Form, translating it into a DHTML file and presenting the DHTML file on the web browser for the end user.

BRIEF SUMMARY

A method parses the contents of an e-Form, where the contents of said e-Form have been divided into more than one section with a different content identification code assigned to each section of the e-Form. The method includes scanning an e-Form submitted for processing to determine, based on the content identification codes, which of the sections have a corresponding parsed result already in a cache system; parsing contents of the sections without a parsed result already in the cache system; and combining parsed results from the cache system with parsed results from the parsing of sections without a parsed result already in the cache system.

A device parses contents of an e-Form, where the contents of the e-Form have been divided into more than one section with a different content identification code assigned to each the section of the e-Form. The device includes a content identification code obtaining module configured to scan an e-Form submitted for processing to obtain the content identification codes; a determining module configured to determine, based on the content identification codes, which of the sections have a corresponding parsed result already in a cache module; a parsing module configured to parse contents of the sections without a parsed result already in the cache module; and a combining module configured to combine parsed results from the cache system with parsed results from parsing of sections without a parsed result already in the cache system.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Throughout this specification, by way of example, an architecture for parsing the contents of an e-Form will be described according to a Lotus WebForm server provided by IBM Corporation. The Lotus WebForm server is able to translate an e-Form with an eXtensible Forms Description Language (XFDL) format into a Dynamic Hyper Text Markup Language (DHTML) file at runtime. Thus, the end user can view, fill, and submit the XFDL e-Form through a web browser without having to download or install a browser plug-in or other piece of software application.

When the end user submits or modifies a filled out e-Form, the WebForm server will translate the e-Form into an XFDL file for further processing. In this case, although the modified e-Form sections may occupy only 10% of the e-Form, the entire e-Form will have to be translated by the WebForm server. Thus, for each submitted e-Form, possibly over 90% of the e-Form's content is duplicative and will still have to be translated again. This wastes server processing time and resources, thus offering a long response time for the end user. As a result of the above-mentioned method for processing e-Forms, when processing large and complex e-Forms, the server can perform poorly as its resources are used for unnecessary operations.

The present specification describes a method for reducing the amount of duplicative material to be parsed by an e-Form server. The principles described herein provide a more efficient method for parsing e-Forms, thus making the e-Form server more efficient. This method will be especially beneficial for the parsing of larger and more complex e-Forms.

According to one example, a method for parsing the contents of an e-Form by an e-Form server is described in which an e-Form is separated into a plurality of independent sections, each section having an identifier for identifying the section. The e-Form server includes a cache for caching parsing results for parsed sections of an e-Form. The method comprises the obtaining of a content identification code for each section of an e-Form submitted for parsing. The content identification code is used to identify the contents of the section. Next, it is determined which sections have previously parsed data already stored in cache and which sections do not. This is done based on the content identification code associated with each section. Next, the parsing results of the cached sections are retrieved from the cache and the non-cached sections are then parsed. Next, the cache is updated with the identifiers, content identification codes and parsing results of the non-cached sections. The parsing results of the cached sections are then combined with the parsing results of the non-cached sections to create a parsing result for the entire e-Form.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
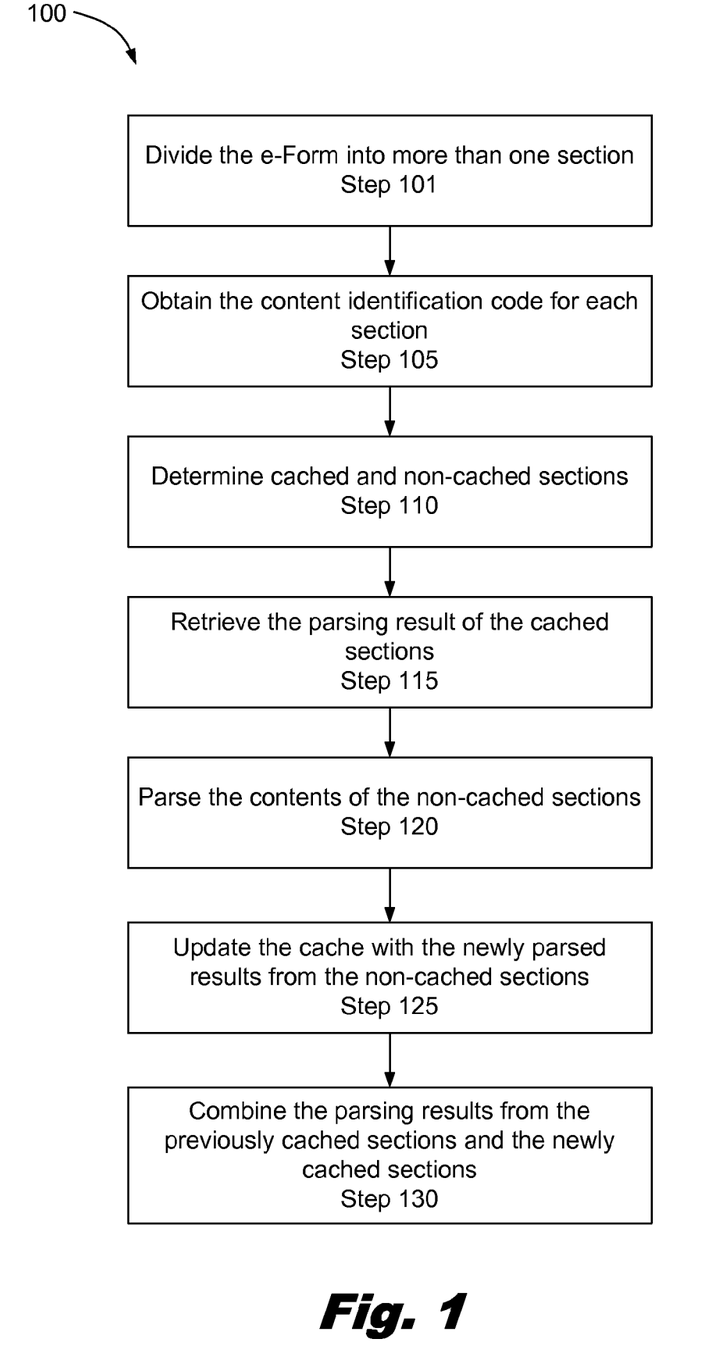
FIG. 1 is an illustrative flowchart showing a method for parsing the contents of an e-Form by an e-Form server, according to one embodiment of the principles described herein.

FIG. 1 is an illustrative flowchart (100) showing a method for parsing the contents of an e-Form by an e-Form server, according to one embodiment of the principles described herein. This embodiment will be described in detail in conjunction with the figure.

In many situations, submitted e-Forms have a lot of duplicative content such as the above-described ACORD XFDL e-Forms. When using traditional parsing methods, the entire content of all the submitted e-Forms will be parsed. Because a generous portion of duplicative content is repeatedly parsed, server resources are unnecessarily utilized.

As shown in FIG. 1, in the design phase, the e-Form is separated into a plurality of independent sections (Step S101). That is, there is no dependency or reference relationship between the different sections with respect to the content analysis that will take place during the parsing phase. In addition, each section has a unique identifier for identifying the section. The identifier can be generated automatically or defined by a user. For example, the identifier could be made up of the e-Form name and a section number, such as e-Form 1-Section 1.

The act of parsing refers to the process by which the e-Form is syntactically scanned and the data is translated and organized into a form more suitable to be processed by various application processes.

Figure 2:
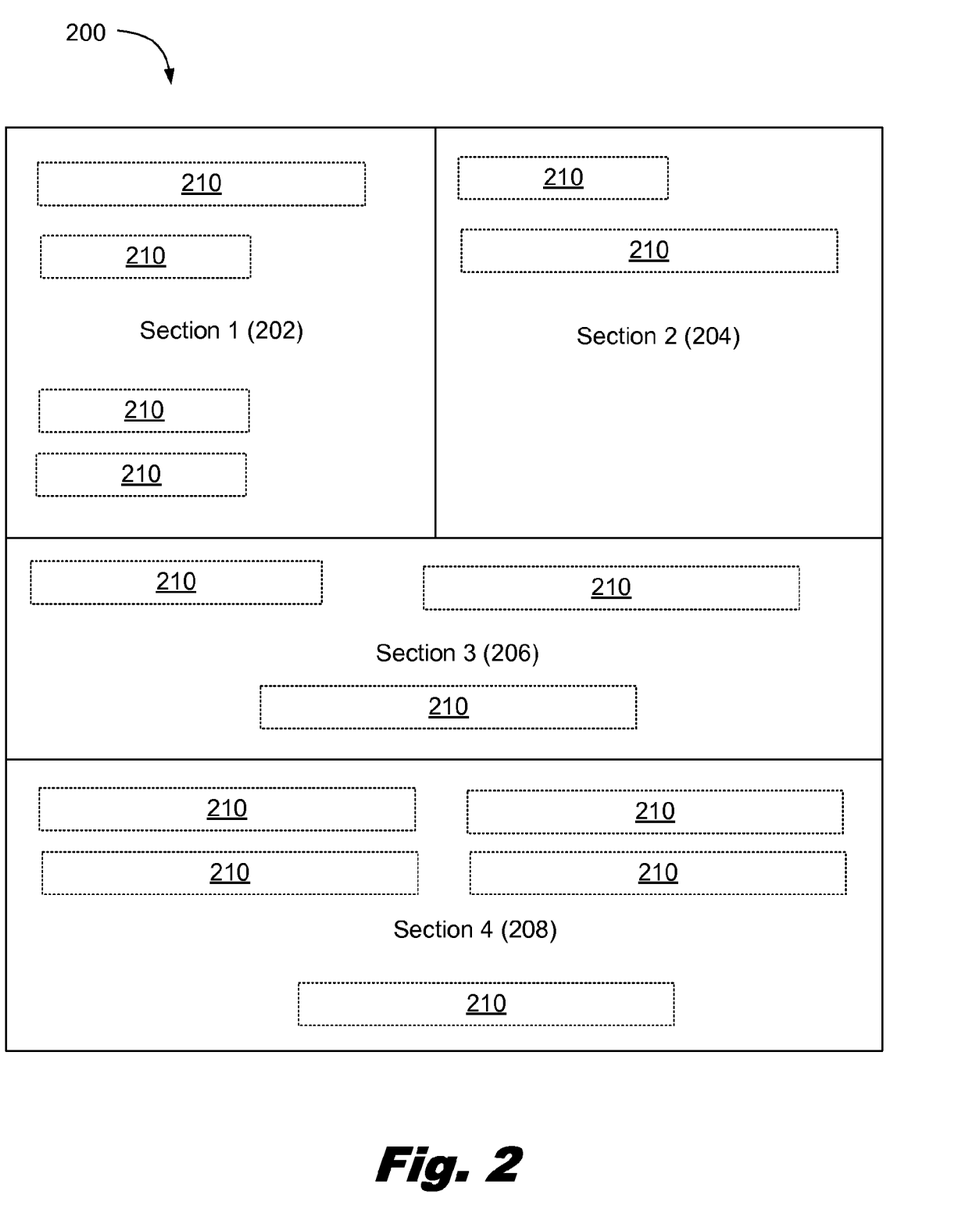
FIG. 2 is an illustrative diagram of an exemplary e-Form, according to one embodiment of the principles described herein.

FIG. 2 shows an illustrative diagram (200) of an exemplary e-Form. As will be appreciated by a person skilled in the relevant art, the e-Form can be a Lotus Forms e-Form provided by IBM Corporation, a PDF e-Form provided by Adobe Corporation, or a Web-based e-Form, etc. The e-Form shown in FIG. 2 is separated into 4 sections: e-Form 1-Section 1 (202), e-Form 1-Section 2 (204), e-Form 1-Section 3 (206), and e-Form 1-Section 4 (208), the contents of which are independent from each other. Each section contains its own input fields (210) for a user to enter data therein. In the parsing or content analysis which will be described in detail later, the contents of these four sections are able to be analyzed respectively.

Referring back to FIG. 1, when an e-Form is filled out by a user on a client machine and then submitted to the e-Form server (Step S105), a content identification code is obtained for each section in the e-Form. The content identification code is used to identify the contents of its associated section. If the contents of a section are changed, so will the content identification code.

In one embodiment, the e-Form is first checked to see if the submitted e-Form contains a content identification code for each section. A content identification code is automatically generated based on the contents of the sections which are stored on a client machine. The content identification codes are then submitted to the e-Form server together with the contents of the e-Form. If it is determined that the e-Form contains the appropriate content identification codes, the codes are then extracted from the e-Form by the e-Form server. If it is determined that the content identification codes are not contained in the e-Form, the content identification code for each section is then generated based on the contents of each section.

In one embodiment, the content identification code could be a hash code. A hash code is merely one example of a coding mechanism which may be used. Any coding method as determined by one skilled in the relevant art will suffice. The exact method for generating hash code is well known, thus a detailed description will not be given.

For purposes of clarity, throughout this specification and the appended claims, the term "cached section" of an e-Form refers to a section of a newly submitted e-form containing previously parsed data for that specific section stored on the system cache. If a section is cached, it will not need to be reparsed. The data in the section has been previously parsed. The term "non-cached section" refers to a section of a newly submitted e-Form which does not have the parsed data currently stored in the server's cache system. This may be the case if the specific section has different data then previously submitted e-Forms.

At Step S110, both cached sections and non-cached sections of the e-Form are determined. Whether a section is determined to have been previously cached is based on the content identification code assigned to each section in Step S105.

In one embodiment, a cache system which is part of an e-Form server is divided up into sections corresponding to sections of an e-Form. After the contents of a particular section are parsed, the identifier of the section, the content identification code and the parsing result will be stored in the cache. By storing the parsing results for individual sections, when parsing the contents of an e-Form, if similar contents in an e-Form have been previously parsed, their parsing results can be used directly from the cache, thus the time and resources for the e-Form server to parse the contents can be saved.

In one embodiment, the cache can be divided into sections, each section being devoted to a particular e-Form. Each section in the cache can also be divided into subsections devoted to the parsing results of individual sections within the e-Form.

In one embodiment, for each section of an e-Form, the cache is searched for the content identification code corresponding to the content identification code of an e-Form section. If the corresponding content identification code is found, the contents of that section have been parsed and cached, thus, the section may be classified as a cached section. If the corresponding content identification code is not found, the contents of the section having that content identification code have not been parsed, thus the section may be classified as a non-cached section. For the non-cached sections, the cache is searched for an identifier of the non-cached section. When the identifier of the non-cached section is found, the content identification code and parsing result corresponding to the identifier of the non-cached section are removed.

At Step S115, the parsing results of the cached sections as determined in Step S110 are retrieved from the cache. In one embodiment, when a section is determined to have been cached, the corresponding sub-spaces in the cache are searched according to the identifier of the cached section, and the corresponding parsing result is located according to its content identification code.

At Step S120, the contents of the non-cached sections will be parsed. Parsing may be defined as any process or operation performed on the contents of an e-Form, such as format translation, calculation, analysis, etc. The specific parsing operation may be customized by an e-Form server according to various requirements. For example, in the above-described Lotus WebForm server, the parsing operation is customized as format translation between XFDL and DHTML. In one embodiment, the content parsing is to translate the contents into a desired format.

At Step S125, the identifiers, content identification codes and parsing results of the non-cached sections are used to update the cache. By updating the cache, if the contents of corresponding sections in any subsequently submitted e-Form are not changed, the cached parsing results of these sections can be retrieved directly without having to re-parse the section. For the same section represented by the same identifier, if the content identification code is changed, it indicates that the contents of the section are changed, so the previous parsing result will be removed and a new parsing result will be cached.

At Step S130, the parsing results of the cached sections retrieved in Step S115 and the parsing results of the non-cached sections obtained in Step S120 are combined together to compose the parsing result of the complete e-Form. The combining operation corresponds to the parsing operation and can be customized by an e-Form server. For example, when the parsing operation is customized as a format translation of an e-Form, the combining operation is customized as a combination of the translated sections together to be a sole translated result. Thus, the contents of a parsed e-Form can be provided to the back-end business services or applications for further processing.

In the above-mentioned parsing method, the e-Form could be separated into multiple sections during the design phase. The contents of the e-Form may be parsed on the basis of section, and the parsing results of the parsed sections can be retrieved directly from the cache without having to unnecessarily re-parse any sections. Even if a particular e-Form may be large or complex, the efficiency of which the contents of an e-Form are parsed and the performance of the e-Form server performing the parsing process can be greatly improved. The parsing workload of an e-Form server may also be decreased, thereby saving the processing time and resources of the e-Form server.

Figure 3:
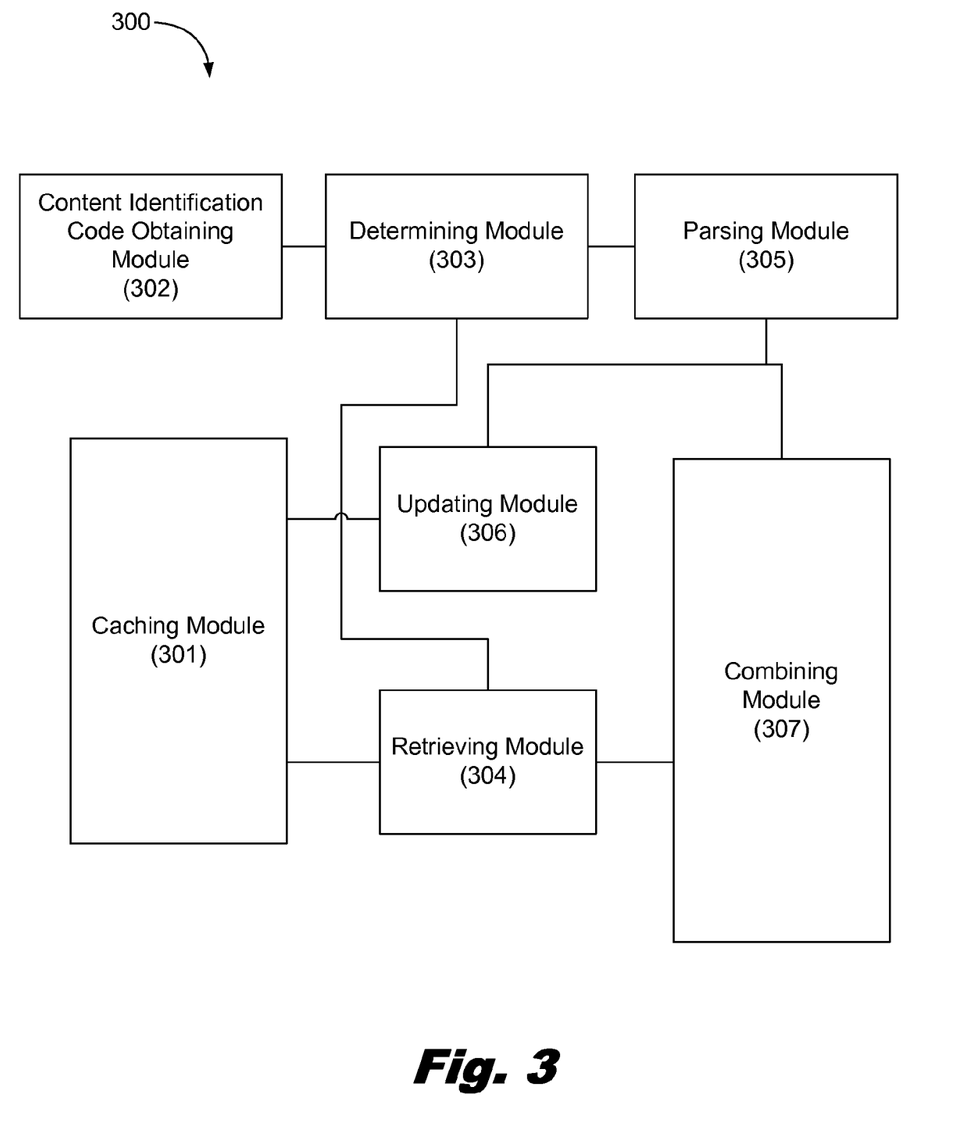
FIG. 3 is an illustrative block diagram showing an e-Form server able to parse the contents of an e-Form, according to one embodiment of the principles described herein.

FIG. 3 is a block diagram (300) showing an e-Form server capable of parsing the contents of an e-Form. Various details which were described above will be omitted from the following description to avoid redundancy.

In one embodiment, as described above, the e-Form is separated into a plurality of independent sections, each section having an identifier used for identifying the section.

As shown in FIG. 3, the e-Form server capable of parsing the contents of an e-Form comprises a caching module (301), which caches the parsing results for parsed sections of an e-Form. A content identification code obtaining module (302) is used to obtain the content identification code for each section of an e-Form. The content identification code is used to identify the contents of the section. A determining module (303) is used to determine which sections of an e-Form are cached and which sections are non-cached. A section may be determined to be cached or non-cached based on the content identification code of each section obtained by the content identification code obtaining module (302). A retrieving module (304) is used to retrieve the parsing results of the cached sections determined by the determining module (303). A parsing module (305) is used to parse the contents of the non-cached sections in the e-Form. An updating module (306) is used to update the caching module (301) with the identifiers, content identification codes, and parsing results of the non-cached sections. A combining module (307) is used to combine the parsing results of the cached sections obtained by the retrieving module (304) and the parsing results of the non-cached sections obtained by the parsing module (305), to compose a complete parsing result of the entire e-Form.

When an e-Form is filled out by a user on a client machine and then submitted to the e-Form server, the checking unit of the content identification code obtaining module (302) checks to see if the submitted e-Form contains a content identification code for each section. If the content identification codes are contained in the e-Form, an extracting unit extracts the content identification codes from the sections of a submitted e-Form. If the content identification codes are not contained in the e-Form, a content identification code generating unit will generate the content identification code for each section based on the contents of the section.

After the content identification codes of each section have been obtained by the content identification code obtaining module (302), the determining module (303) uses a searching unit to search the caching module (301) for the content identification code corresponding to the content identification code of the e-Form section. This is done for each section of an e-Form. When a corresponding content identification code is found by the searching unit, the determining unit will determine that a section having the content identification code is a cached section. When a corresponding content identification code is not found by the searching unit, the determining unit will determine that the section is a non-cached section. Further, the searching unit searches the caching module (301) for the identifier of the non-cached sections. When the identifiers of the non-cached sections are found, a removing unit will remove the content identification codes and parsing results corresponding to the identifiers of the non-cached sections.

Next, the retrieving module (304) retrieves from the caching module (301), the parsing results for the cached sections. The parsing module (305) then parses the contents of the non-cached sections. As described above, the parsing module (305) can perform format translation, calculation, analysis, or any other similar operation including customized operations. In one embodiment, the parsing module (305) comprises a translating unit, which translates the contents into a desired format. The updating module (306) updates the caching module (301) with the parsing result, identifier, and content identification code of the non-cached sections.

Figure 4:
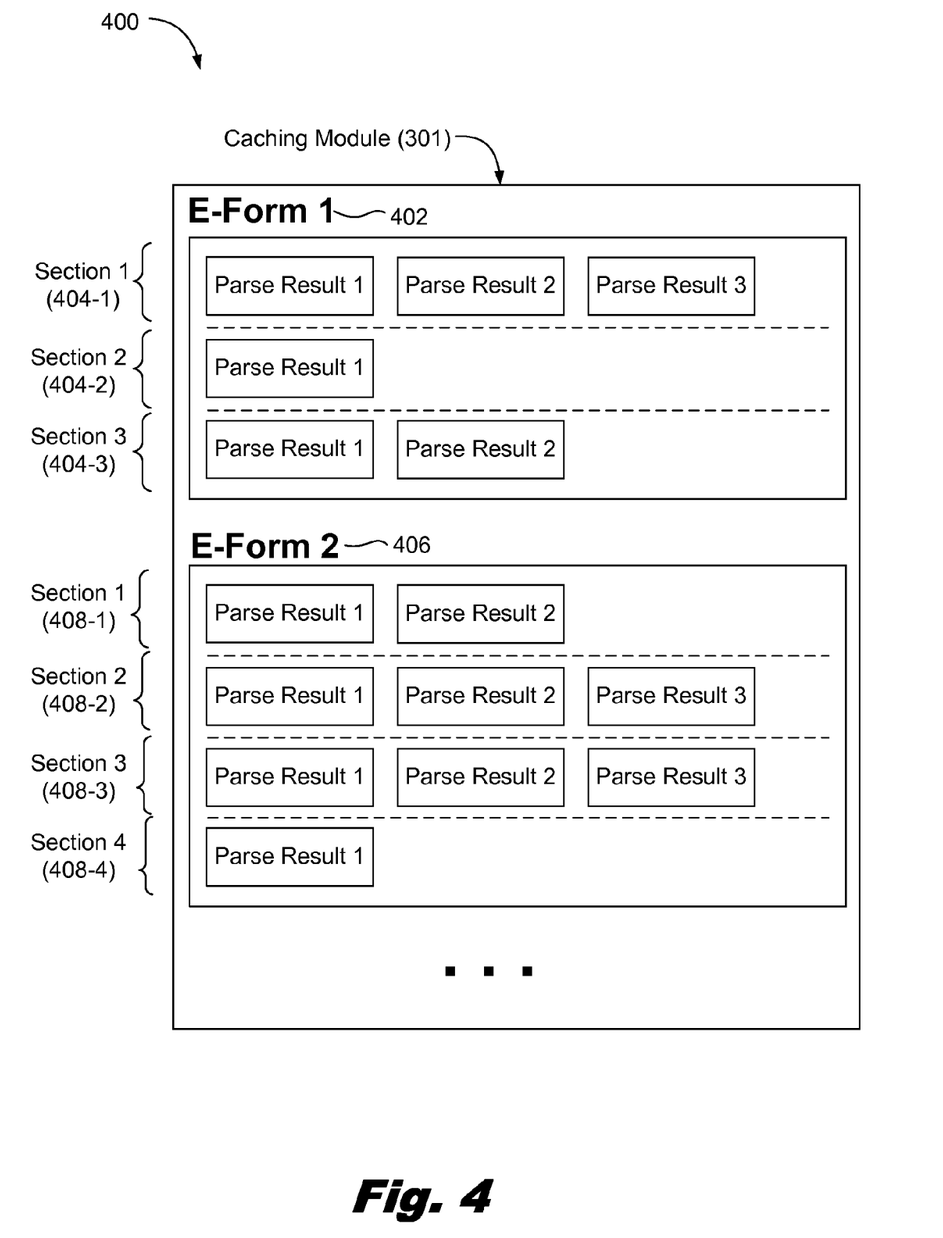
FIG. 4 is a schematic block diagram of a caching module used by an e-Form server, according to one embodiment of the principles described herein.

FIG. 4 is an illustrative diagram (400) of an exemplary caching module (301). In one embodiment, the caching module (301) is divided into sections, each section being assigned to a particular e-Form. Each section of the cache can be divided into sub-sections, each sub-section being assigned to a section of an e-Form. For example, the e-Form 1 is separated into three sections: e-Form 1—Section-1 (404-1), e-Form 2—Section-2 (404-2), and e-Form 3—Section-3 (404-3). Correspondingly, there are also three sub-sections in the e-Form 1 cache storage space, and each sub-section stores an identifier, content identification code and a parsing result of the corresponding section. The caching module (301) may store any number of e-Forms along with their associated sections. For example, FIG. 1 also shows cache spaces for a second e-Form, e-Form 2 (406). E-form 2 (406) contains four sub-sections (408-1,408-2,408-3,408-4).

The retrieving module (304) comprises a sub-section searching unit which searches the caching module (301) for the sub-sections according to the identifiers of the cached sections. The retrieving module (304) also comprises a parsing result determining unit which determines the parsing results according to the content identification codes of the cached sections.

The combining module (307) combines the parsing results of the cached sections retrieved by the retrieving module (304) and the parsing results of the non-cached sections obtained by the parsing module (305) to form a complete parsing result of the entire e-Form. As described above, the combining operation of the combining module (307) corresponds to the parsing operation of the parsing module (305).

The e-Form server which parses the contents of an e-Form and its components can be implemented by hardware circuits such as a Very Large Scale Integrated Circuit (VLSIC) or gate array, semiconductors such as logic chips and transistors, or a programmable hardware device such as field programmable gate array, programmable logic device, and by software executing on various types of processors, and by the combination of above hardware circuit and software. The e-Form server for parsing contents of an e-Form can operationally realize the method for parsing contents of an e-Form in an e-Form server as shown in FIG. 1.

Although the method for parsing contents of an e-Form in an e-Form server and the corresponding e-Form server are described in detail in conjunction with one embodiment, the present invention is not limited as above. It will be understood by a person being skilled in the relevant art that the above embodiments may be varied, replaced or modified without departing from the intention and the scope of the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for parsing contents of an e-Form, the contents of said e-Form having been divided into more than one section with a different content identification code assigned to each said section of said e-Form, the method comprising:
   scanning an e-Form submitted for processing to determine, based on said content identification codes, which of said sections have a corresponding parsed result already in a cache system;
   during said scanning, generating a content identification code for any section that does not have an associated content identification code, in which the content identification code is generated based on contents of the section found not to already have an associated content identification code;
   parsing contents of said sections without a parsed result already in said cache system; and
   combining parsed results from said cache system with parsed results from said parsing of sections without a parsed result already in said cache system.

2. The method of claim 1, further comprising preparing said e-Form by:
   dividing the contents of said e-Form into said sections; and
   assigning a content identification code to each said section.

3. The method of claim 1, further comprising updating the cache system with said parsed results from parsing sections without a parsed result already in said cache system.

4. The method of claim 1, further comprising changing a content identification code if contents of the corresponding section of the e-Form are changed.

5. The method of claim 1, further comprising storing parsed results for sections from a number of different e-Forms in said cache system.

6. The method of claim 1, further comprising receiving and scanning said submitted e-Form with a server system configured to parse said e-Form.

7. The method of claim 1, wherein said content identification code comprises a hash code.

8. The method of claim 1, in which the parsing contents of sections without a parsed result already in said cache system comprises translating said e-Form from eXtensible Forms Description Language (XFDL) to Dynamic Hyper Text Markup Language (DHTML).

9. A device for parsing contents of an e-Form, the contents of said e-Form having been divided into more than one section with a different content identification code assigned to each said section of said e-Form, the device comprising a server comprising:
   a content identification code obtaining module configured to scan an e-Form submitted for processing to obtain said content identification codes, said content identification code obtaining module comprising a content identification code generating unit configured to generate a content identification code for a section lacking a content identification code, the content identification code for that section being generated based on the contents of that section;
   a determining module configured to determine, based on said content identification codes, which of said sections have a corresponding parsed result already in a cache module;
   a parsing module configured to parse contents of said sections without a parsed result already in said cache module; and
   a combining module configured to combine parsed results from said cache system with parsed results from parsing of sections without a parsed result already in said cache system.

10. The device of claim 9, further comprising an updating module configured to update the cache system with said parsed results from parsing sections without a parsed result already in said cache system.

11. The device of claim 9, in which said cache system stores parsed results for sections from a number of different e-Forms.

12. The device of claim 11, in which said cache module is divided into sections, each section storing data for a particular e-Form.

13. The device of claim 9, wherein said content identification code comprises a hash code.

14. The device of claim 9, in which the parsing module translates sections without a parsed result already in said cache module by translating said e-Form from eXtensible Forms Description Language (XFDL) to Dynamic Hyper Text Markup Language (DHTML).

15. The device of claim 9, in which each section includes input fields.

16. The device of claim 9, in which said content identification code obtaining module comprises a checking unit configured to determine if a submitted e-Form contains a content identification code for each section, each section including user-input fields.

17. The device of claim 9, in which said content identification code obtaining module comprises a checking unit configured to determine if a submitted e-Form contains a content identification code for each section.

18. The device of claim 17, in which said content identification code obtaining module comprises an extracting unit configured to extract the content identification codes from the sections of a submitted e-Form.

19. The device of claim 9, further comprising a retrieving module, controlled by said determining module, for selectively providing parsed results from said caching module to said combining module.

20. A computer program product for parsing contents of an e-Form, the contents of said e-Form having been divided into more than one section with a different content identification code assigned to each said section of said e-Form, the computer program product comprising:
   a computer readable storage memory having computer readable program code embodied therewith, the computer readable program code comprising:
   computer readable program code configured to scan an e-Form submitted for processing to determine, based on said content identification codes, which of said sections have a corresponding parsed result already in a cache system;
   computer readable program code configured to parse contents of said sections without a parsed result already in said cache system;
   computer readable program code configured to combine parsed results from said cache system with parsed results from said parsing of sections without a parsed result already in said cache system; and
   computer readable program code configured to generate a content identification code for any section of said e-Form that does not have an associated content identification code, where the content identification code is generated based on contents of the section found not to already have an associated content identification code.

21. The computer program product of claim 20, further comprising computer readable program code configured to update the cache system with said parsed results from parsing sections without a parsed result already in said cache system.

22. The computer program product of claim 20, wherein said content identification code comprises a hash code.

* * * * *